US012802841B2

(12) United States Patent
Shin et al.

(10) Patent No.: US 12,802,841 B2
(45) Date of Patent: Nov. 17, 2026

(54) FLEXIBILITY-IMPROVED CENTRAL TENSILE MEMBER FOR OVERHEAD TRANSMISSION CABLE AND OVERHEAD TRANSMISSION CABLE INCLUDING THE SAME

(71) Applicant: LS CABLE & SYSTEM LTD., Anyang-si (KR)

(72) Inventors: Seung Hyun Shin, Suwon-si (KR); Jae Ik Lee, Gangnam-gu (KR); Jee Yong Park, Anyang-si (KR); Seung Hwan Eun, Dongjak-gu (KR); Chan Woong Park, Hwaseong-si (KR); Min Seok Kwon, Songpa-gu (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 216 days.

(21) Appl. No.: 18/718,959

(22) PCT Filed: Dec. 22, 2022

(86) PCT No.: PCT/KR2022/021106
§ 371 (c)(1),
(2) Date: Jun. 12, 2024

(87) PCT Pub. No.: WO2023/121359
PCT Pub. Date: Jun. 29, 2023

(65) Prior Publication Data

US 2024/0420870 A1 Dec. 19, 2024

(30) Foreign Application Priority Data

Dec. 24, 2021 (KR) ........................ 10-2021-0187021
Dec. 22, 2022 (KR) ........................ 10-2022-0181696

(51) Int. Cl.
*H01B 9/00* (2006.01)
*H01B 1/24* (2006.01)
(Continued)

(52) U.S. Cl.
CPC ............... *H01B 9/006* (2013.01); *H01B 1/24* (2013.01); *H01B 3/47* (2013.01); *H01B 7/205* (2013.01); *H01B 9/008* (2013.01)

(58) Field of Classification Search
None
See application file for complete search history.

(56) References Cited

U.S. PATENT DOCUMENTS 7,179,522 B2 * 2/2007 Hiel ........................ H01B 5/105
428/297.4
8,433,165 B2 * 4/2013 Han ..................... G02B 6/4416
385/101
(Continued)

FOREIGN PATENT DOCUMENTS

CN 110246611 A 9/2019
EP 1821318 A2 * 8/2007 ............. H01B 5/105
(Continued)

OTHER PUBLICATIONS

International Search Report for related International Application No. PCT/KR2022/021106; action dated Jun. 29, 2023; (3 pages).
(Continued)

*Primary Examiner* — Krystal Robinson
(74) *Attorney, Agent, or Firm* — K&L Gates LLP

(57) ABSTRACT

The present disclosure relates to a flexibility-improved central tensile member for an overhead transmission cable, and an overhead transmission cable including the same. In particular, the present disclosure relates to a flexibility-improved central tensile member for an overhead transmission cable, and an overhead transmission cable including the same, wherein the central tensile member has excellent tensile strength and thus has excellent sag properties preventing the wired overhead transmission cable from sagging, and has sufficient flexibility and thus improves wiring workability. Moreover, the central tensile member can suppress corrosion and damage to a conductor wire arranged around the central tensile member and thus can eliminate or minimize an increase in resistance of the overhead transmission cable, as well as a resultant reduction in transmission capacity, and makes it possible to reduce weight and manufacturing costs of the overhead transmission cable.

17 Claims, 2 Drawing Sheets

(51) Int. Cl.

| | |
|---|---|
| ***H01B 3/47*** | (2006.01) |
| ***H01B 7/20*** | (2006.01) |

(56) References Cited

U.S. PATENT DOCUMENTS

| | | | | |
|---|---|---|---|---|
| 9,159,468 | B2 * | 10/2015 | Kebbabi | H01B 5/107 |
| 2005/0029006 | A1 * | 2/2005 | Takahashi | H01B 11/10<br>174/102 R |
| 2019/0096547 | A1 * | 3/2019 | Kumada | H01B 11/12 |
| 2019/0221332 | A1 * | 7/2019 | Grant | H01B 11/1847 |

FOREIGN PATENT DOCUMENTS

| | | | | |
|---|---|---|---|---|
| JP | H10321048 | A | * | 12/1998 |
| JP | 2012094258 | A | | 5/2012 |
| KR | 20160016044 | A | | 2/2016 |
| KR | 10-2021-0114348 | A | † | 9/2021 |
| KR | 20210114348 | A | | 9/2021 |

OTHER PUBLICATIONS

Written Opinion for related International Application No. PCT/KR2022/021106; action dated Jun. 29, 2023; (4 pages).

CTC Global Corporation, Engineering Transmission Lines with High Capacity Low Sag ACCC Conductors, First edition, ISBN # 978-0-615-57959-7, 2011.†

ASTM International, B987/B987M-14, Standard Specification for Carbon Fiber Composite Core (CFCC/TS) for USE in Overhead Electrical conductors, Sep. 2014.†

* cited by examiner
† cited by third party

FLEXIBILITY-IMPROVED CENTRAL TENSILE MEMBER FOR OVERHEAD TRANSMISSION CABLE AND OVERHEAD TRANSMISSION CABLE INCLUDING THE SAME

CROSS-REFERENCE TO RELATED APPLICATIONS

The present application is a National Stage of International Application No. PCT/KR2022/021106, filed on Dec. 22, 2022, which claims priority to Korean Application No. 10-2021-0187021, filed Dec. 24, 2021, and Korean Application No. 10-2022-0181696, filed on Dec. 22, 2022, the entire contents of each hereby incorporated by reference.

FIELD

The present disclosure relates to a central tensile member for an overhead transmission cable with improved flexibility, and to an overhead transmission cable including the same. In particular, the present disclosure relates to a central tensile member for an overhead transmission cable with improved flexibility, and an overhead transmission cable including the same, in which the central tensile member has excellent tensile strength to have excellent sag properties preventing the wired overhead transmission cable from sagging downward, while having sufficient flexibility to improve wiring workability and suppressing corrosion and damage to conductor wires disposed around a periphery of the central tensile member, thereby avoiding or minimizing an increase in resistance of the overhead transmission cable and a resultant reduction in transmission capacity and enabling a reduction in weight and manufacturing costs of the overhead transmission cable.

BACKGROUND

Methods of supplying electricity from power plants to cities and factories through electrical substations include an overhead transmission method using overhead transmission cables connected with pylons and an underground transmission method using underground transmission cables buried underground, with the overhead transmission method accounting for about 90% of domestic transmission methods.

An aluminum conductor steel reinforced (ACSR) overhead transmission cable, in which multiple strands of aluminum alloy conductors are stranded around an outer periphery of a central tensile member to achieve high tensile properties, is commonly used as a conventional overhead transmission cable.

However, the aluminum conductor steel reinforced (ACSR) overhead transmission cable has a large sag due to a large load of a steel core itself used as a central tensile member, and there is a limitation in increasing the weight of the aluminum conductor to increase the transmission capacity of the overhead transmission cable, and there have been attempts to lighten the overhead transmission cable by using a fiber-reinforced composite in the central tensile member to reduce the sag of the overhead transmission cable or to increase the transmission capacity relative to the same sag.

FIG. 1 schematically illustrates a cross-sectional structure of a conventional overhead transmission cable having a central tensile member that includes a fiber-reinforced composite.

As illustrated in FIG. 1, the conventional overhead transmission cable may include a central tensile member 10 and conductor wires 20 disposed on the periphery thereof. The central tensile member 10 may include an inner layer 11 made of a carbon fiber-reinforced composite and an outer layer 12 made of the same aluminum material as the conductor wire 20 for inhibiting corrosion of the conductor wire 20 by dissimilar metal contact corrosion between the inner layer 11 and the conductor wires 20, that is, galvanic corrosion.

However, the conventional overhead transmission cable suffers from a problem that the wiring workability is reduced due to insufficient flexibility of the inner layer 11 of the central tensile member 10, which is made of a carbon fiber-reinforced composite. In addition, there is a problem that the tensile strength of the central tensile member 10 is degraded by heating of the conductor wire 20 due to insufficient heat resistance, resulting in the degradation of the sag properties such as the wired overhead transmission cable being sagged downward, or the transmission capacity is reduced when a heating temperature of the conductor wire 20 is limited to prevent the degradation of the tensile strength of the central tensile member 10. Further, there is a problem that the manufacturing cost of the overhead transmission cable increases when the number of the conductor wire 20 increases to increase the transmission capacity.

Therefore, there is an acute need for a central tensile member for an overhead transmission cable with improved flexibility, and an overhead transmission cable including the same, in which the central tensile member has excellent tensile strength excellent sag properties preventing the wired overhead transmission cable from sagging downward, while having sufficient flexibility to improve wiring workability and suppressing corrosion and damage to conductor wires disposed around a periphery of the central tensile member, thereby avoiding or minimizing an increase in resistance of the overhead transmission cable and a resultant reduction in transmission capacity and enabling a reduction in weight and manufacturing costs of the overhead transmission cable.

SUMMARY

The present disclosure is directed to providing a central tensile member for an overhead transmission cable, and an overhead transmission cable including the same, which has excellent tensile strength to prevent the wired overhead transmission cable from sagging downward, as well as sufficient flexibility to improve wiring workability.

In addition, the present disclosure is directed to providing a central tensile member for an overhead transmission cable and an overhead transmission cable including the same, which can suppress corrosion and damage to conductor wires disposed on the periphery of the central tensile member, thereby avoiding or minimizing an increase in resistance of the overhead transmission cable and a resultant reduction in transmission capacity.

Further, the present disclosure is directed to providing a central tensile member for an overhead transmission cable and an overhead transmission cable including the same, which enables a reduction in weight and manufacturing costs of the overhead transmission cable.

To achieve the above-mentioned objects, the present disclosure is directed to providing a central tensile member for an overhead transmission cable in which a plurality of conductor wires are disposed at a periphery thereof, the central tensile member may include: a wire layer in which a plurality of wires including a carbon fiber-reinforced plastic that includes a carbon fiber in a thermosetting resin matrix is stranded; and a binding layer surrounding the wire layer, wherein the plurality of wires forming the wire layer are stranded in a predetermined direction, and wherein a pitch of the stranded wires is 100 to 500 times an outer diameter of the wire layer.

Here, the wire layer may have a tensile strength of 75% or more compared to a tensile strength of a case where the plurality of stranded wires are not stranded.

In addition, the outer diameter of the wire layer may be 6 to 15 mm.

Further, the wire forming the wire layer may have an outer diameter of 2 to 5 mm.

Meanwhile, relationship between a glass transition temperature Tg of the wire layer and an allowable operating temperature To of the conductor wire after 400 hours is as below.

$$To-Tg<40\ °C.$$

Here, the allowable operating temperature To after 400 hours of the conductor wire means a constant temperature such that a tensile strength measured after heating the conductor wire at the constant temperature for 400 hours is 90% relative to an initial tensile strength at room temperature before heating.

Here, the glass transition temperature Tg of the wire layer may be 140 °C or higher.

In addition, a fill factor of the wire layer may be 72% or more and 95% or less.

Further, the binding layer may include a heat-resistant tape that is cross-wound in a predetermined direction.

Here, two to six layers of heat-resistant tape having a width of 10 to 25 mm and a thickness of 0.001 to 0.2 mm may be cross-wound with a wrap rate of 35% or more to form the heat-resistant tape.

In addition, the heat-resistant tape may be made of a material having a melting point of 200 °C or higher.

Further, the heat-resistant tape may include a heat-resistant tape made of one or more materials selected from the group consisting of polyamide, polyimide, silicone, and Teflon.

Meanwhile, the thermosetting resin matrix may include a base resin having a glass transition temperature Tg of 140 °C or higher.

In addition, the carbon fiber may include a high-strength continuous fiber having a diameter of 3 to 35 μm, and have a tensile strength of 3.5 to 5.0 GPa, a modulus of elasticity of 140 to 600 GPa, and a coefficient of thermal expansion of 0 μm/m °C or less.

Further, the present disclosure is directed to providing an overhead transmission cable, the overhead transmission cable including: the central tensile member; a metal tube surrounding the central tensile member; and a plurality of conductor wires disposed on an outer side of the metal tube.

Here, the binding layer may be formed along tangential lines on surfaces of adjacent wires that form the wire layer such that a gap is formed between the binding layer and the metal tube.

In addition, the metal tube may have a thickness of 0.3 to 2.5 mm.

Further, the conductor wire may include a plurality of aluminum wire rods made of aluminum or an alloy thereof, and the metal tube may be made of an aluminum material.

Here, the aluminum wire rod may be made of an aluminum alloy including one or more alloying elements selected from Zr (zirconium), Sc (scandium), and Zn (zinc).

Advantageous Effects

The central tensile member for an overhead transmission cable according to the present disclosure, with a precisely designed stranded structure and a heat-resistant tape to stably maintain the stranded structure, possesses sufficient tensile strength to have excellent sag properties to prevent the wired overhead transmission cable from sagging downward, and has a greatly improved flexibility, which exhibits an excellent effect of improving wiring workability.

In addition, the central tensile member for an overhead transmission cable according to the present disclosure is capable of maintaining the tensile strength even when the conductor wire is heated due to the excellent heat resistance, and thus does not limit the heating temperature of the conductor wire, thereby exhibiting an excellent effect of avoiding or minimizing the reduction of the transmission capacity of the overhead transmission cable.

Further, the central tensile member for an overhead transmission cable according to the present disclosure exhibits an excellent effect of enabling a reduction in the weight and manufacturing costs of the overhead transmission cable by minimizing an outer diameter of the overhead transmission cable through a precisely designed stranded structure.

DETAILED DESCRIPTION

Figure 1:
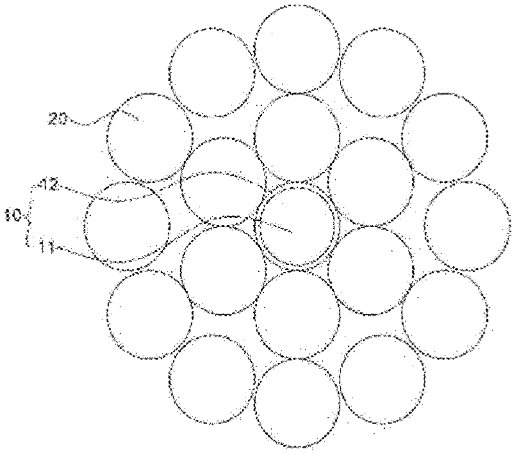
FIG. 1 schematically illustrates a cross-sectional structure of a conventional overhead transmission cable.

Hereinafter, exemplary embodiments of the present disclosure will be described in detail. However, the present disclosure is not limited to the exemplary embodiments to be described below and may be specified as other aspects. On the contrary, the embodiments introduced herein are provided to make the disclosed content thorough and complete, and sufficiently transfer the spirit of the present disclosure to those skilled in the art. Like reference numerals indicate like constituent elements throughout the specification.

Figure 2:
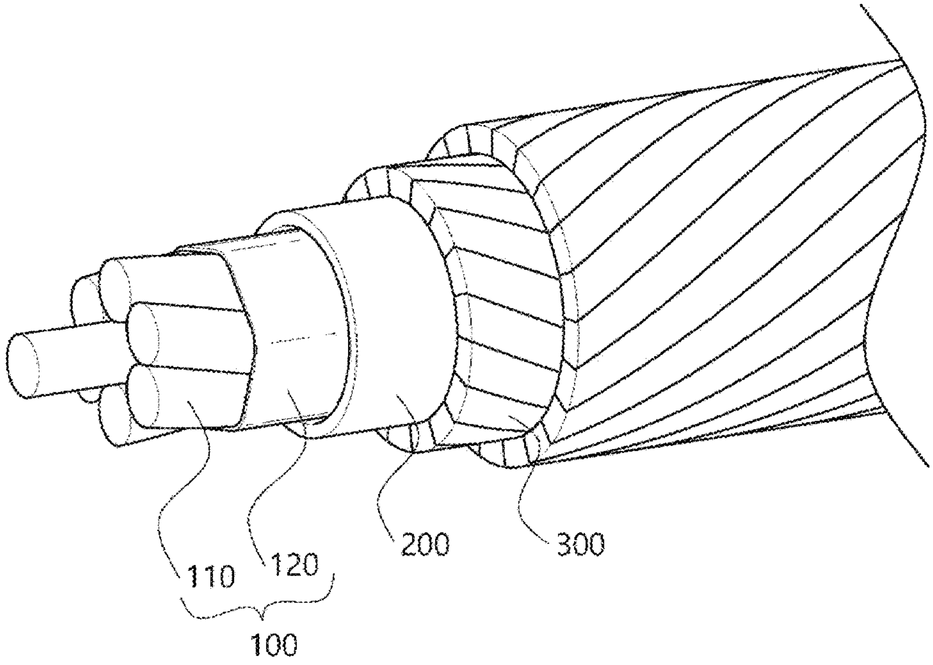
FIG. 2 is a schematic perspective view illustrating one embodiment of a central tensile member for an overhead transmission cable according to the present disclosure.
Figure 3:
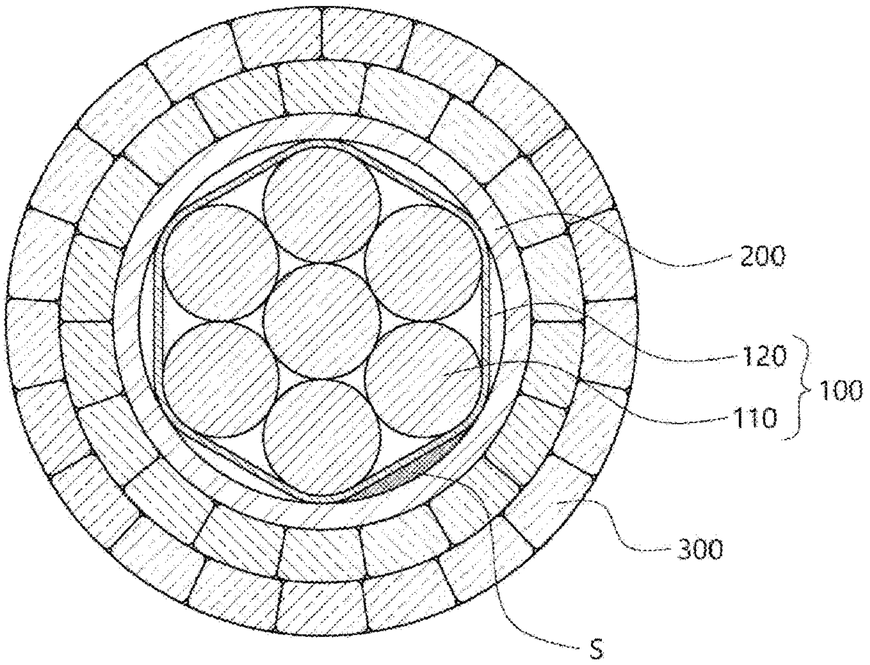
FIG. 3 schematically illustrates a transverse sectional structure of the central tensile member for an overhead transmission cable according to the disclosure illustrated in FIG. 2.

FIG. 2 is a schematic view of a longitudinal cross-sectional structure of one embodiment of a central tensile member for an overhead transmission cable according to the present disclosure, and FIG. 3 schematically illustrates a perspective view of the central tensile member for an overhead transmission cable according to the present disclosure illustrated in FIG. 2.

As illustrated in FIGS. 2 and 3, a central tensile member 100 for an overhead transmission cable according to the present disclosure may include a wire layer 110 disposed in the center and a binding layer 120 surrounding the wire layer 110. A metal conductor wire 300 for power transmission is disposed on the periphery of the central tensile member 100 for an overhead transmission cable, and a metal tube 200 may be provided between the central tensile member 100 and the metal conductor wire 300 to inhibit the dissimilar metal contact corrosion of the metal conductor wire 300 and reduce the resistance of the metal conductor wire 300.

When an overhead transmission cable including a conductor wire disposed on the periphery of the central tensile member 100 is installed between pylons, the central tensile member 100 may be formed to extend continuously in a lengthwise direction of the overhead transmission cable since a tensile force is applied in a lengthwise direction of the central tensile member 100, thereby securing a sufficient tensile strength.

The wire layer 110 is formed as a stranded structure in which a plurality of wires formed of a fiber-reinforced plastic including carbon fiber as a reinforcing fiber in a thermosetting resin matrix are stranded, thereby improving the flexibility of the central tensile member 100, which can greatly improve the wiring workability of the overhead transmission cable.

Here, a glass transition temperature Tg of the wire layer 110 including the plurality of wires of a fiber-reinforced plastic material is lower than an allowable operating temperature To after 400 hours of the conductor wire 300 disposed on the periphery of the central tensile member 100, but a difference therebetween may be adjusted to be lower than 40 °C, thereby maintaining a tensile strength of 2.6 to 3.6 Gpa due to sufficient heat resistance of the wire layer 100 even when the conductor wire 300 is heated.

That is, the relationship between the glass transition temperature Tg of the wire layer 110 and the allowable operating temperature To of the conductor wire 300 after 400 hours may be set as follows.

$$To-Tg<40\ °C.$$

Here, the allowable operating temperature after 400 hours of the conductor wire 300 means a constant temperature such that the tensile strength measured after heating the conductor wire 300 at the constant temperature for 400 hours is 90% relative to an initial tensile strength at room temperature before heating.

In addition, since the wire layer 110 is formed as a stranded structure in which a plurality of wires are stranded, even if any of the plurality of wires is damaged, the tensile strength can be maintained with the remaining wires to prevent the overhead transmission cable from sagging downward, unlike the conventional structure formed with a single wire, which cannot fulfill the function as a central tensile member when the wire is damaged.

In addition to securing flexibility through the above-mentioned stranded structure, the binding layer 120 surrounds the wire layer 110 along a tangential line of surfaces of adjacent wires forming the wire layer 110, so that a gap S is naturally formed between a surface of the binding layer 120 and the metal tube 200. Heat generated during the conform extrusion of an aluminum rod for the formation of the metal tube 200 is inhibited by the gap S from being directly transferred to the binding layer 120 of the central tensile member 100, thereby preventing deterioration of the binding layer 120. Further, when a bending stress is applied to the central tensile member 100 for an overhead transmission cable, the metal tube 200 behaves separately from the wire layer 110 and the binding layer 120 due to the gap S, so that most of the bending stress is applied to the wire layer 110, which includes a fiber-reinforced plastic wire rod having a relatively large tensile strength. Therefore, a stress applied to the metal tube 200, which is formed of an aluminum material or the like having a relatively low tensile strength, is minimized while the low-sag properties of the overhead transmission cable are implemented, so that the damage to the metal tube 200 upon winding on bobbins, drums, pulleys, or the like for manufacturing or installing the overhead transmission cable may be suppressed.

Here, a cross-section of the wire may be circular or may be a trapezoidal shape that is either bent or unbent. The wire layer 110 includes a central wire and a plurality of wires of one layer surrounding the central wire, and in particular, the plurality of wires of one layer may be subjected to a lay in a predetermined direction to keep the stranded structure stable while maintaining the targeted tensile strength.

Specifically, a pitch of the wire layer 110 to which the lay is applied may be 100 times or more, for example, 100 times to 500 times an outer diameter of the wire layer 110, in which the outer diameter of the wire layer 110 means an outer diameter of a circle having a largest outer diameter among circles tangent to surfaces of wires disposed on an outermost periphery of the wire layer 110 to which the lay is applied on the plurality of wires. Here, when the pitch is less than 100 times, the tensile strength of the wire layer 110 may be greatly degraded as stresses caused by the lay are applied to the wire due to the excessively short pitch, while it may be difficult for the stranded structure of the wire layer 110 to remain stable when the pitch is greater than 500 times.

Accordingly, the wire layer 110 to which the lay is applied by the pitch may have tensile strength of 75% or more compared to tensile strength of a wire layer having the same stranded structure except that the lay is not applied. Here, the tensile strength of the wire layer to which the lay is not applied is tensile strength of the central wire to which the lay is not applied in the wire layer to which the lay is applied. Even if the lay is applied to the wire layer, the lay is not applied to the central wire among the plurality of wires that form the wire layer. Therefore, it is possible to identify the tensile strength of the wire layer to which the lay is not applied when the tensile strength of the central wire is measured.

In practice, when the number of wires included in the wires of one layer is six and an outer diameter of each wire is 2 to 5 mm, a tensile strength ratio of the wire layer according to the lay pitch applied to the wires of one layer, that is, a percentage relative to the tensile strength of the wire layer to which the lay is not applied in the same stranded structure, is as summarized in Table 1 and FIG. 4 below.

TABLE 1

| Pitch multiplier(×Outer diameter) | Tensile strength ratio(%) | Tensile strength (GPa) |
|---|---|---|
| 10 | 5.0 | 0.176 |
| 50 | 30.0 | 1.054 |
| 70 | 40.5 | 1.421 |
| 80 | 54.8 | 1.925 |
| 90 | 60.5 | 2.124 |
| 100 | 75.1 | 2.638 |
| 110 | 76.9 | 2.699 |
| 135 | 79.8 | 2.802 |
| 140 | 80.9 | 2.841 |
| 150 | 82.6 | 2.901 |
| 180 | 85.7 | 3.01 |
| 200 | 87.9 | 3.086 |
| 230 | 91.1 | 3.201 |
| 240 | 93.0 | 3.267 |
| 250 | 94.3 | 3.312 |
| 300 | 97.7 | 3.43 |
| 500 | 99.8 | 3.505 |
| ∞ (No pitch) | 100 | 3.512 |

Figure 4:
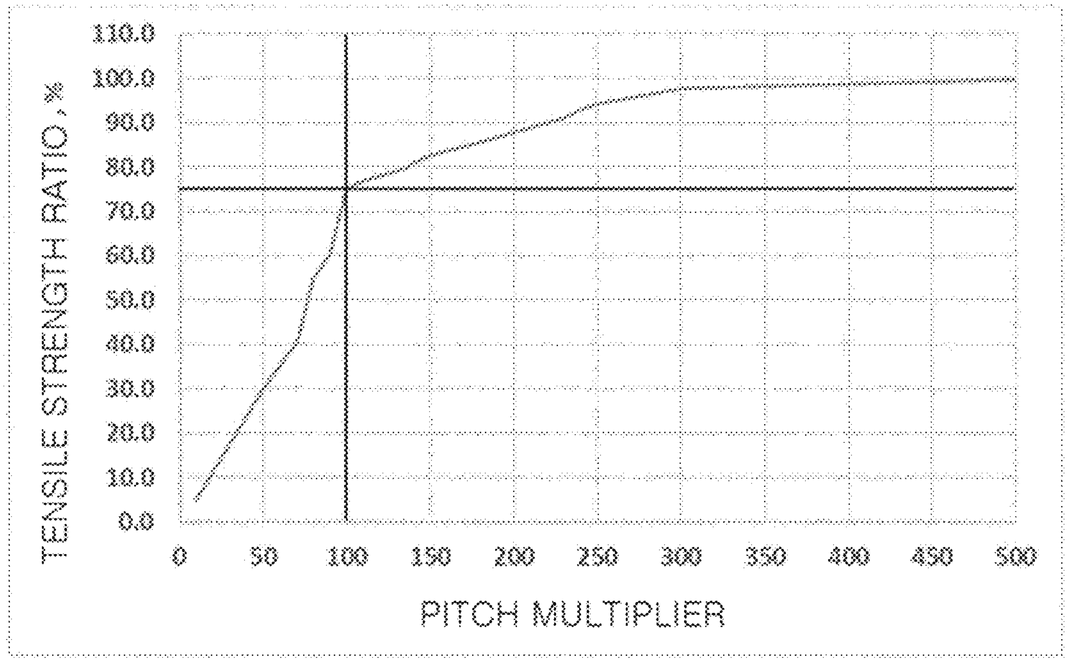
FIG. 4 illustrates a tensile strength ratio of a wire layer according to a lay pitch applied to a wire.

As shown in Table 1 and FIG. 4, it was confirmed that the tensile strength of the wire layer decreases rapidly as the lay pitch becomes shorter, starting from 100 times, based on which, it is possible to secure sufficient tensile strength of 2.6 to 3.6 GPa, which is 75% or more compared to the tensile strength of the wire layer to which the lay is not applied, while adjusting the lay pitch to 100 times or more, and simultaneously secure the stability of the stranded structure with the application of the lay pitch. Further, the outer diameter of each of the plurality of wires forming the wire layer 110 may be 2 to 5 mm, and the outer diameter of the wire layer 100 may be 6 to 15 mm. A fill factor of the wire layer 110 may be 72% or more, for example, 72 to 95%, in which the fill factor means a ratio of a sum of an area of each of the plurality of wires forming the wire layer 110 relative to an area of the outer diameter of the wire layer 110.

In practice, when the outer diameter of the wire layer 100 is 6 to 15 mm, the flexibility of the central tensile member depending on the lay pitch applied to the wire and the fill factor of the wire layer 110 is as summarized in Table 2 below.

TABLE 2

| Fill factor(%) | Pitch multiplier(×Outer diameter) | Bending Radius of Curvature (65D) |
|---|---|---|
| 72 | 150 | Pass |
| 75 | 150 | Pass |
| 85 | 150 | Pass |
| 96 | 150 | Fail |
| 98 | 150 | Fail |
| 72 | 300 | Pass |
| 75 | 300 | Pass |
| 85 | 300 | Pass |
| 96 | 300 | Fail |
| 98 | 300 | Fail |

As described in Table 2 above, it was confirmed that when the fill factor of the wire layer 110 is 72% or more and 95% or less, the central tensile member 100 has a radius of curvature of 65 times or less of the outer diameter of stranded wire on the premise that the lay pitch multiplier applied to the stranded wire of the wire layer 110 is 100 times or more based on the outer diameter of stranded wire, so that the flexibility of the central tensile member 100 is excellent. In contrast, when the fill factor of the wire layer 110 is less than 72%, the tensile strength of the central tensile member may be insufficient, while the flexibility of the central tensile member may be insufficient when the fill factor is greater than 95%, resulting in a deterioration of the wiring workability of the overhead transmission cable.

Here, the bending radius of curvature of the wire layer 110 is measured in accordance with standard ASTM B987. A load of 15% of the tensile strength of the wire layer 110 was applied to one end of the wire layer 110 for 60 seconds, and then the wire layer 110 was visually observed to evaluate the bending radius of curvature based on the presence of cracks or damage, in a state in which the wire layer 110 is wound on a cylindrical mandrel having a diameter of 65 times the outer diameter of the wire layer 110 and the portions of the wire layer 110 not in contact with the mandrel are disposed to be parallel to each other at 180°.

The thermosetting resin matrix may be formed by adding additives such as a curing agent, a curing accelerator, a release agent, and the like to a base resin such as an epoxy-based resin, an unsaturated polyester resin, a bismaleimide resin, a polyimide resin, and the like having a glass transition temperature Tg of 140 °C or higher, preferably an epoxy resin. When the glass transition temperature Tg of the base resin is lower than 140 °C, the heat resistance of the central tensile member 100 is insufficient so that the central tensile member 100 is not applicable to an overhead transmission cable to which a conductor with high heat resistance is applied.

Meanwhile, the glass transition temperature Tg of the base resin may be evaluated using a dynamic mechanical analyzer (DMA), and a DMA facility of TA Instrument may be used as an evaluation facility, but the evaluation facility is not limited thereto.

In particular, the epoxy resin may include a diglycidyl ether bisphenol A type epoxy resin, a multi-functional group epoxy resin, a diglycidyl ether bisphenol F type resin, and the like, and preferably a mixture of these three types of epoxy resins. When the mixture of the three types of epoxy resin is used, the heat resistance may be relatively improved compared to the use of the diglycidyl ether bisphenol A type epoxy resin alone, and the flexural properties and flexibility may be improved.

The curing agent may include an acid anhydride curing agent such as methyl tetrahydrophthalic anhydride (MTHPA), tetrahydrophthalic anhydride (THPA), hexahydrophthalic anhydride (HHPA), nadic methyl anhydride (NMA), preferably methyl tetrahydrophthalic anhydride or nadic methyl anhydride, or an amine-based curing agent, such as an alicyclic polyamine-based compound, such as menthane diamine (MDA), isoprondiamine (IPDA), or an aliphatic amine-based compound, such as diaminodiphenyl sulfone (DDS) or diaminodiphenylmethane (DDM) and the like, which is a liquid phase of curing agent.

The content of the acid anhydride-based curing agent may be 70 to 150 parts by weight, and the content of the amine-based curing agent may be 20 to 50 parts by weight, based on 100 parts by weight of the base resin. When the content of the acid anhydride-based curing agent is less than 70 parts by weight or the content of the amine-based curing agent is less than 20 parts by weight, the heat resistance of the thermosetting resin matrix may be degraded by insufficient curing during curing. When the content of the acid anhydride-based curing agent is greater than 150 parts by weight or the content of the amine-based curing agent is greater than 50 parts by weight, unreacted curing agent may remain in the thermosetting resin matrix an impurity, thereby reducing the heat and act as resistance and other properties of the thermosetting resin matrix.

The curing accelerator is to promote the curing of the thermosetting resin matrix by the curing agent. It is preferable to use an imidazole-based curing accelerator when the curing agent is an acid anhydride-based curing agent, or a boron trifluoride ethylamine-based curing accelerator when the curing agent is an amine-based curing agent.

The content of the imidazole-based curing accelerator may be 1 to 3 parts by weight, and the content of the boron trifluoride ethylamine-based curing accelerator may be 2 to 4 parts by weight, based on 100 parts by weight of the base resin. When the content of the imidazole-based curing accelerator is less than 1 part by weight or the content of the boron trifluoride ethylamine-based curing accelerator is less than 2 parts by weight, a fully cured thermosetting resin matrix may not be obtained. In contrast, when the content of the imidazole-based curing accelerator is greater than 3 parts by weight or the content of the boron trifluoride ethylamine-based curing accelerator is greater than 4 parts by weight, the curing time is shortened due to the fast reaction speed, and the viscosity of the thermosetting resin matrix increases rapidly, resulting in a decrease in workability.

The release agent reduces a friction force with a molding die during molding of the thermosetting resin matrix to facilitate molding processing, and for example, zinc stearate or the like may be used.

The content of the release agent may be 1 to 5 parts by weight based on 100 parts by weight of the base resin. When the content of the release agent is less than 1 part by weight, the workability of the thermosetting resin matrix may be degraded. In contrast, when the content of the release agent is greater than 5 parts by weight, the workability of the thermosetting resin matrix may not be further improved and the manufacturing cost may only increase.

The carbon fiber may be a high-strength continuous fiber having a diameter of 3 to 35 μm, and have a tensile strength of 3.5 to 5.0 GPa, a modulus of elasticity of 140 to 600 GPa, and a coefficient of thermal expansion of close to zero or less than 0 μm/mc °C. When the diameter of the carbon fiber is less than 3 μm, it is not economical because it is difficult to be manufactured. In contrast, when the diameter is greater than 35 μm, the tensile strength may be greatly reduced.

The carbon fiber may be surface treated to improve compatibility with the base resin of the thermosetting resin matrix. A coupling agent for treating the surface of the carbon fiber may include, but is not particularly limited to, for example, a titanate-based, silane-based, zirconate-based coupling agent or the like, as long as the coupling agent is capable of treating the surface of the high-strength fiber, and may be used alone or in a mixture of two or more types.

A number of reactive groups are introduced on the surface of the carbon fiber that has been surface treated with the coupling agent. These reactive groups react with the polymer resin to prevent inter-fiber agglomeration and eliminate bubbles and defects that affect the properties of a final product, thereby improving the interfacial bonding of the high-strength carbon fiber with the thermosetting resin and the dispersibility of the high-strength carbon fiber.

A total volume fraction of the carbon fiber may be greater than 75% and less than 85%, preferably 78 to 83%, based on a total volume of the wire layer. Here, the total volume fraction of the carbon fiber may be defined as below.

Total volume fraction of carbon fiber (%)=(total volume of carbon fiber/total volume of wire layer)×100

Here, when the volume fraction of the carbon fiber is 75% or less, the tensile strength of the central tensile member 100 may be insufficient, resulting in a decrease in the sag properties of the overhead transmission cable. In contrast, when the volume fraction of the carbon fiber is 85% or more, the flexibility of the central tensile member 100 may be insufficient, and thus the wiring workability of the overhead transmission cable may be degraded, and the agglomeration phenomenon between the carbon fibers may increase, resulting in bubbles or cracks in the wire layer 110, which may greatly degrade the physical properties and workability.

The binding layer 120 performs a function of enabling the stranded structure of the plurality of wires stranded to form the wire layer 110 to remain stable without being unwound, while further inhibiting the degradation of the tensile strength of the central tensile member 100 from the heating of the conductor wire 300 disposed on the periphery of the central tensile member 100.

For example, the binding layer 120 may include a heat-resistant tape made of a material having a melting point of 200 °C or higher, for example a material such as polyamide, in particular an aramid fiber, polyimide, silicone, Teflon, or the like, and preferably a heat-resistant tape cross-wound in two or more layers, for example two to six layers. The heat-resistant tape may have a width of 10 to 25 mm and a thickness of 0.001 to 0.2 mm, and may be designed such that when the heat-resistant tape is cross-wound in multiple layers, a width of an upper layer of the heat-resistant tape covers a width of a lower layer of the heat-resistant tape at a wrap rate of 35% or more, preferably 50% or more.

Here, when the wrap rate of the heat-resistant tape is less than 35% upon being cross-wound, the heat resistance of the binding layer 120 is insufficient, and when the central tensile member 100 is subjected to flexing, there may be a problem that the overlapping portions of the heat-resistant tape may be damaged by spreading or colliding with each other.

The metal tube 200 may further inhibit damage to the conductor wire 300 caused by contact and friction between the central tensile member 100 and the conductor wire. A metal material having a good electrical conductivity, for example a metal material having an electrical conductivity of 55 to 64% IACS, preferably of the same aluminum material as the conductor wire 300, may further perform a function of reducing an overall resistance of the overhead transmission cable and consequently improving the transmission capacity by being energized with the conductor wire 300 disposed on the periphery of the central tensile member 100.

Here, a thickness of the metal tube 200 may be 0.3 to 2.5 mm. When the thickness of the metal tube 200 is less than 0.3 mm, the effect of reducing the overall resistance of the overhead transmission cable is insignificant, while when the thickness is greater than 2.5 mm, there are difficulties in manufacturing the central tensile member 100. Since the outer diameters of the wire layer 110 and the binding layer 120 become smaller with respect to the central tensile member 100 of the same outer diameter, there is a problem that the tensile strength of the central tensile member 100 is reduced and the low-sag properties may not be implemented.

The metal tube 200 may be formed by, for example, conform extrusion of a metal rod, such as aluminum, or by welding a metal tape, such as aluminum. In particular, it is preferable to form the metal tube 200 by conform extrusion of an aluminum rod, in which case the metal tube 200 may be formed in a long form, which may improve productivity.

In addition, in the case of conform extrusion, since the metal tube 200 having a continuously formed surface with no seams such as welded parts may be formed, it is possible to prevent galvanic corrosion from occurring due to breakage of a seam part by a bending stress acting on the central tensile member 100 upon manufacturing and installing or after installing the central tensile member 100 or the overhead transmission cable provided with the central tensile member 100.

The metal tube 200 may be formed by extruding a metal material or the like into a tube shape. Specifically, the metal material surrounding the central tensile member 100 and having an inner diameter greater than the outer diameter of the central tensile member 100 may be formed by extrusion into a tube shape, and then gradually reduced in diameter to form the metal tube 200.

Meanwhile, the conductor wire 300 for power transmission may include an aluminum wire rod made of 1000 series aluminum, such as 1050, 1070, 1100, or 1200, or a heat-resistant aluminum alloy including alloying elements such as Zr (zirconium), Sc (scandium), Zn (zinc), and the like. Before heat treatment, the conductor wire may have a tensile strength of approximately 15 to 25 kgf/$cm^2$ and an elongation of less than approximately 5%, and after heat treatment, the conductor wire may have a tensile strength of less than approximately 9 kgf/$cm^2$ and an elongation of approximately 20% or more. The alloying elements as described above contribute to inhibiting the growth of grains, thereby improving the tensile strength and heat resistance of aluminum wire rod.

In addition, the aluminum wire rod may have a trapezoidal shape or a circular shape in cross-section, and in the case of a trapezoidal shape, the fill factor of the conductor may significantly increase compared to the aluminum wire rod of the overhead transmission cable having a circular shape in cross-section, thereby maximizing the transmission capacity and transmission efficiency of the overhead transmission cable. For example, a conventional conductor including an aluminum wire rod having a circular shape in cross section may have a fill factor of approximately 75%, while the conductor including an aluminum wire rod having a trapezoidal shape in cross section may have a fill factor of approximately 95% or more.

The aluminum wire rod having a trapezoidal shape in cross-section may be formed by conform extrusion using a trapezoidal die or by wire drawing. When the aluminum wire rod is formed by conform extrusion, no separate heat treatment is required because the aluminum wire rod is naturally heat treated during the extrusion process, but when the aluminum wire rod is formed by wire drawing, a separate heat treatment may be performed subsequently.

The aluminum wire rod may be heat treated during the conform extrusion process or subsequently heat treated after wire drawing, thereby releasing the stress-concentrated areas that are formed inside the aluminum tissue and hinder the flow of electrons due to twisting or the like during the extrusion or drawing process. Accordingly, the electrical conductivity of the aluminum wire rod can be improved, and consequently, the transmission capacity and transmission efficiency of the overhead transmission cable can be improved.

A cross sectional area of the aluminum wire rod and the number of the aluminum wire rods may be suitably selected according to the specifications of the overhead transmission cable. For example, the cross sectional area of the aluminum wire rod may be 3.14 to 50.24 mm', and when the aluminum wire rod having a trapezoidal shape in cross section is converted to an aluminum wire rod having a circular shape in cross section with the same cross sectional area, a cross sectional diameter of the converted aluminum wire rod may be 2 to 8 mm.

In addition, the number of the aluminum wire rods may be, for example, 12 to 40, and the conductor wire 300 may preferably have a double-layer structure including 8 aluminum wire rods in an inner layer and 12 in an outer layer.

The aluminum wire rod may be heat treated to improve the electrical conductivity as described above. As the surface becomes vulnerable to scratches due to softening in the case of such heat treatment, a number of scratches may be generated on the surface of the aluminum wire rod by external pressure or impact during the manufacturing, transportation, and installation of the overhead transmission cable. As a result, corona discharge may occur during the operation of the overhead transmission cable, which may cause high-frequency noise.

Accordingly, a surface hardness reinforcement layer may be formed on the surface of the aluminum wire rod to suppress the generation of scratches on the surface. Preferably, the surface hardness reinforcement layer may have a thickness of 5 μm or more, preferably exceeding 10 μm and being 50 μm or less. When the thickness of the surface hardness reinforcement layer is less than 5 μm, the surface hardness of the aluminum wire rod may not be sufficiently improved, and thus, in the process of manufacturing, transportation, installation, or the like of the overhead transmission cable, a number of scratches may be generated on the surface of the aluminum wire rod by external pressure, impact, or the like. In contrast, when the thickness exceeds 50 μm, the surface hardness reinforcement layer may be locally broken or cracked when the overhead transmission cable is flexed, such as when the overhead transmission cable is wound on a bobbin.

Further, as the surface hardness reinforcement layer is formed on the surface of the aluminum wire rod, the tensile strength of the overhead transmission cable may be further improved, resulting in the sag of the overhead transmission cable being further suppressed.

The surface hardness reinforcement layer may be formed on an entire surface of the plurality of aluminum wire rods constituting the overhead transmission cable. Preferably, the surface hardness reinforcement layer may be formed on an entire surface of each of the aluminum wire rods present in an outermost layer of the plurality of aluminum wire rods, and more preferably on an outer surface that forms the outer periphery of the overhead transmission cable among the respective surfaces of the aluminum wire rods present in the outermost layer.

The surface hardness reinforcement layer may include, but is not particularly limited to, for example, an aluminum oxide thin film formed by an anodizing treatment, or a plating thin film of nickel (Ni), tin (Sn), or the like, as long as the surface hardness of the aluminum wire rod may be improved thereby suppressing the generation of scratches.

Specifically, a method of anodizing the surface of the aluminum wire rod may include cleaning to remove organic contaminants, such as oil, present on the surface of the aluminum wire rod, rinsing to wash the surface of the aluminum wire rod with clean water, etching to remove aluminum oxide present on the surface of the aluminum wire rod with sodium hydroxide or the like, desmutting to dissolve and remove residual alloying components on the surface of the aluminum wire rod after etching, rinsing to clean the surface of the aluminum wire rod again with clean water, anodizing, which is performed by applying a voltage of 20 to 40 V to form a dense and stable aluminum oxide thin film on the surface of the aluminum wire rod, rinsing to clean the surface of the aluminum wire rod 10 with clean water again, drying, which is air drying at room temperature, and the like.

When the surface hardness reinforcement layer includes an aluminum oxide thin film by the anodizing treatment, the power loss can be reduced because of the insulation property of the aluminum oxide thin film, and the Joule heat generated during transmission can be quickly dissipated to the atmosphere by the high radiation property of the aluminum oxide thin film, thereby increasing the current capacity.

In addition, the surface hardness reinforcement layer may be further coated by a polymer resin such as a fluoroplastic resin. The polymer resin may impart a super water repellent effect to the aluminum oxide thin film, thereby inhibiting the adsorption of atmospheric dust or pollutants or the formation of snow or ice in winter on the surface of the overhead transmission cable.

The surface hardness reinforcement layer may include both the aluminum oxide thin film by the anodizing treatment and the plating thin film such as nickel (Ni) and tin (Sn). When the surface hardness reinforcement layer includes both the aluminum oxide thin film and the plating thin film, the aluminum oxide thin film may be disposed on a lower portion and the plating thin film may be disposed on an upper portion of the aluminum oxide thin film, and a thickness ratio of the aluminum oxide thin film to the plating thin film may be approximately 3:1 to 5:1.

When the thickness ratio of the aluminum oxide thin film to the plating thin film is 3:1 to 5:1, the hardness of the surface of the aluminum wire rod can be sufficiently improved by the aluminum oxide thin film, which is relatively thick and has a relatively good surface hardness improvement effect, while the local cracking, breakage, or the like of the surface hardness reinforcement layer can be effectively suppressed when the overhead transmission cable is flexed, such as when the overhead transmission cable is wound on a bobbin or the like, by the plating thin film, which is disposed on the outer side and has a relatively small risk of cracking, breakage, or the like on flexing.

While the present disclosure has been described above with reference to the exemplary embodiments, it may be understood by those skilled in the art that the present disclosure may be variously modified and changed without departing from the spirit and scope of the present disclosure disclosed in the claims. Therefore, it should be understood that any modified embodiment that essentially includes the constituent elements of the claims of the present disclosure is included in the technical scope of the present disclosure.

The invention claimed is:

1. A central tensile member for an overhead transmission cable in which a plurality of conductor wires are disposed at a periphery thereof, the central tensile member comprising:

- a wire layer in which a plurality of wires including a carbon fiber-reinforced plastic that includes a carbon fiber in a thermosetting resin matrix is stranded; and
- a binding layer surrounding the wire layer,
- wherein the plurality of wires forming the wire layer are stranded in a predetermined direction,
- wherein a pitch of the stranded wires is 100 to 500 times an outer diameter of the wire layer, and
- wherein a relationship between a glass transition temperature Tg of the wire layer and an allowable operating temperature To of the conductor wire after 400 hours is as below:

$$To-Tg<40\ ^{\circ}\mathrm{C}$$

- wherein, the allowable operating temperature To after 400 hours of the conductor wire means a constant temperature such that a tensile strength measured after heating the conductor wire at the constant temperature for 400 hours is 90% relative to an initial tensile strength at room temperature before heating.

2. The central tensile member of claim 1, wherein the wire layer has a tensile strength of 75% or more compared to a tensile strength of a central wire of the plurality of wires.

3. The central tensile member of claim 2, wherein the outer diameter of the wire layer is 6 to 15 mm.

4. The central tensile member of claim 3, wherein the wire forming the wire layer has an outer diameter of 2 to 5 mm.

5. The central tensile member of claim 1, wherein the glass transition temperature Tg of the wire layer is 140 °C or higher.

6. The central tensile member of claim 1, wherein a fill factor of the wire layer is 72% or more and 95% or less.

7. The central tensile member of claim 1, wherein the binding layer includes a heat-resistant tape that is cross-wound in a predetermined direction.

8. The central tensile member of claim 7, wherein two to six layers of heat-resistant tape having a width of 10 to 25 mm and a thickness of 0.001 to 0.2 mm are cross-wound with a wrap rate of 35% or more to form the heat-resistant tape.

9. The central tensile member of claim 7, wherein the heat-resistant tape is made of a material having a melting point of 200 °C or higher.

10. The central tensile member of claim 7, wherein the heat-resistant tape includes a heat-resistant tape made of one or more materials selected from the group consisting of polyamide, polyimide, silicone, and Teflon.

11. The central tensile member of claim 1, wherein the thermosetting resin matrix includes a base resin having a glass transition temperature Tg of 140 °C or higher.

12. The central tensile member of claim 1, wherein the carbon fiber includes a high-strength continuous fiber having a diameter of 3 to 35 μm, and has a tensile strength of 3.5 to 5.0 GPa, a modulus of elasticity of 140 to 600 GPa, and a coefficient of thermal expansion of 0 μm/m °C or less.

13. An overhead transmission cable comprising:

- the central tensile member of claim 1;
- a metal tube surrounding the central tensile member; and
- a plurality of conductor wires disposed on an outer side of the metal tube.

14. The overhead transmission cable of claim 13, wherein the binding layer is formed along tangential lines on surfaces of adjacent wires that form the wire layer such that a gap is formed between the binding layer and the metal tube.

15. The overhead transmission cable of claim 13, wherein the metal tube has a thickness of 0.3 to 2.5 mm.

16. The overhead transmission cable of claim 13, wherein the conductor wire includes a plurality of aluminum wire rods made of aluminum or an alloy thereof, and the metal tube is made of an aluminum material.

17. The overhead transmission cable of claim 16, wherein the aluminum wire rod is made of an aluminum alloy including one or more alloying elements selected from Zr (zirconium), Sc (scandium), and Zn (zinc).

* * * * *